Aug. 19, 1969   R. N. ADRIEN ET AL   3,462,091
CROSS WOUND COIL WINDING MACHINE
Filed March 8, 1968
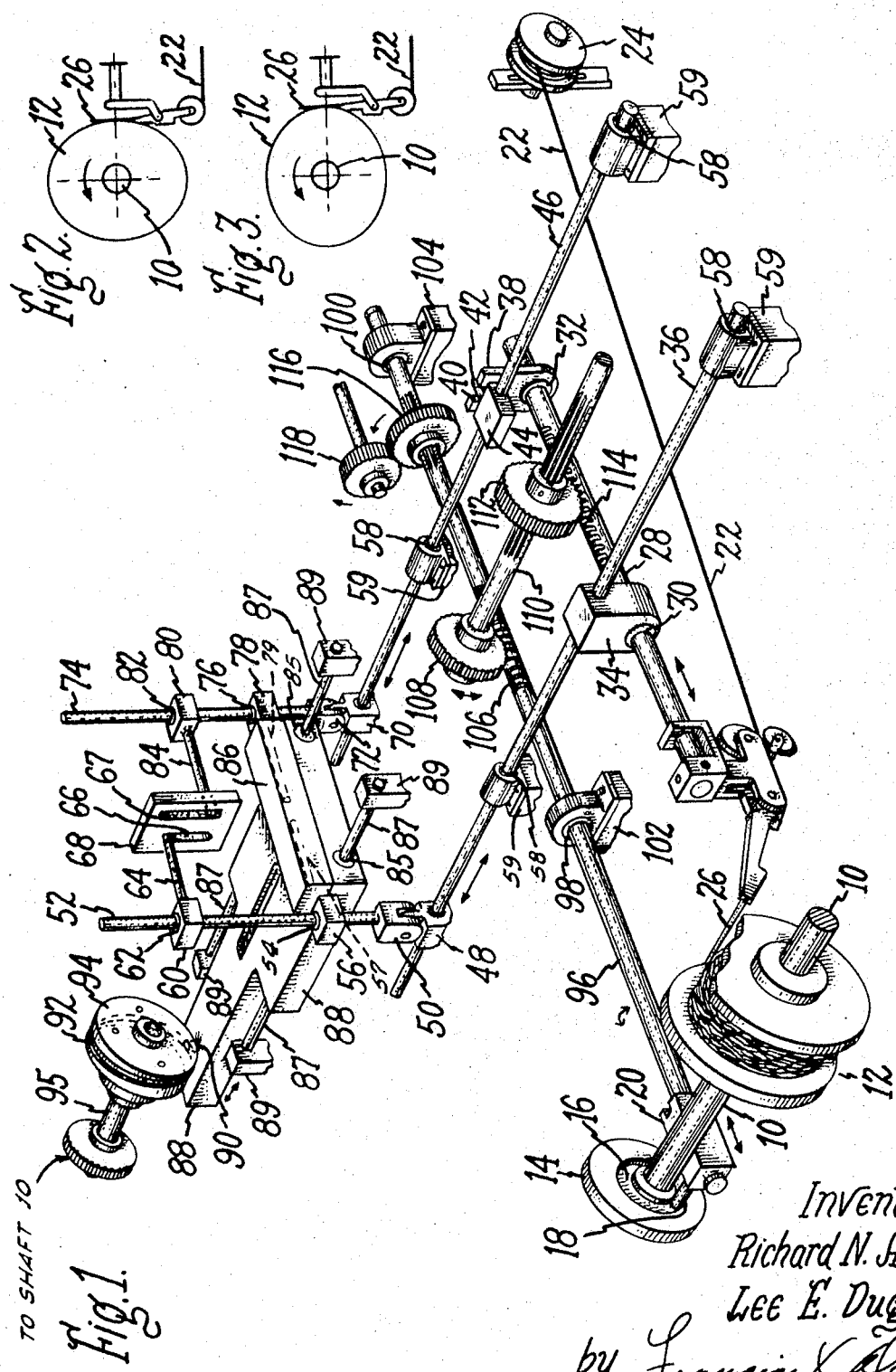
Inventors,
Richard N. Adrien,
Lee E. Duggan,
by Francis X. Doyle
Their Attorney.

United States Patent Office 3,462,091
Patented Aug. 19, 1969

3,462,091
CROSS WOUND COIL WINDING MACHINE
Richard N. Adrien, Somersworth, N.H., and Lee E. Duggan, Arlington, Mass., assignors to General Electric Company, a corporation of New York
Filed Mar. 8, 1968, Ser. No. 711,781
Int. Cl. H01f 11/04
U.S. Cl. 242—7.15                                7 Claims

ABSTRACT OF THE DISCLOSURE

A coil winding machine for winding a cross wound open mesh coil. The winding machine includes a needle member through which the wires threaded to accurately place the wire in the desired position on the winding spool. The winding needle is actuated by a pair of cams and a stroke adjustment to move the needle along the spool and maintain the wire tangent to the surface of the spool. An additional actuation in the form of a gear train is provided to maintain the needle the required distance from the spool as the coil is wound on the spool.

Background of the invention

This invention relates to a coil winding machine and more particularly to a coil winding machine for winding cross wound open mesh coils.

It has been disclosed in application Ser. No. 505,824, filed Nov. 1, 1965 now Patent 3,396,356 for Cross Wound Open Mesh Coil and Method of Making in the name of R. E. Whipple and assigned to the same assignee as this application that a cross wound, open mesh coil can be made by using a needle member for positively placing each portion of such winding in a required position on a winding spool or arbor. This application discloses a novel winding machine which may be used to wind an oval or elliptical shaped cross wound open mesh coil similar to that set forth in the aforementioned application.

In winding cross wound open mesh coils, it is necessary that each turn of the coil be carefully positioned and that the edges of the coil be firmly positioned against the flanges of the arbor or spool on which the coil is wound. Further in winding the wire into a coil, as the turns are laid angularly across the winding spool, it is very desirable that the winding device be maintained tangential to the surface of the coil and at the same angle as the turn to insure proper placement of the turn. It has recently been discovered that oval or elliptical shaped, cross wound coils have desirable electrical and mechanical characteristics, however, it has been very difficult to accurately position the turns of the coil and to maintain the winding device tangential to the surface of the coil when winding oval shaped coils. It has been discovered that a winding machine can be provided to perform these operations by using cams which are related to the arbor rotation such that the winding device will move in unison with the arbor and oscillate to provide the desired angular relation to the coil being wound. Further, by use of a gearing mechanism, the winding device may be moved out from the arbor a distance equal to a portion of the total buildup of the wire as each turn is laid on the coil to maintain the winding device tangent to the surface of such coil.

Therefore it is one object of this invention to provide a novel machine for winding an oval or elliptical shaped cross wound open mesh coil.

A further object of this invention is to provide a novel winding machine for winding an oval or elliptical cross wound open mesh coil provided with cams relating to the winding arbor to actuate the winding means to assure accurate placement of the turns on such oval coil.

A still further object of this invention is to provide a novel winding machine for winding oval coils having an actuating means related to the winding of the coil which will maintain the winding device tangent to the surface of the coil and spaced therefrom as the coil is being wound.

Summary of invention

In carrying out this invention in one form, a cross wound open mesh coil winding machine is provided for winding oval or elliptical shaped coils. The winding machine uses a hollow needle means to wind the wire on an oval arbor. The winding needle is mounted on a movable rod member which is cam actuated to move in and out in unison with the position of the oval arbor. Also, cam means are provided to translate and oscillate the needle across the width of the winding arbor to accurately position each turn of wire on the coil being wound. Gear means are provided related to the arbor rotating power means, to move the needle out from the arbor the distance of a portion of the total buildup of wire as each turn is laid on the coil.

The invention which is sought to be protected will be particularly pointed out and distinctly claimed in the claims appended hereto. However, it is believed that this invention and the manner in which its various objects and advantages are obtained as well as other objects and advantages thereof, will more fully understood by reference to the the following detailed description of a preferred embodiment thereof, particularly when considered with reference to the accompany drawing.

Brief description of drawing

FIGURE 1 is a partial perspective of one form of winding machine incorporating the features of this invention for winding an oval shaped, cross wound open mesh coil; and FIGURES 2 and 3 are end views of an oval spool showing the needle movement during rotation of the spool.

Description of preferred embodiment

According to the preferred embodiment of this invention, a winding machine for winding an oval or elliptical shaped, cross wound, open mesh coil is provided having a drive shaft 10 driven from a power source (not shown). Mounted on the drive shaft 10 is an oval shaped winding arbor 12 and a similarly oval shaped cam member 14. The cam member 14 has an oval groove 16 which receives a cam follower 18. The cam follower 18 forms a portion of a slide 20. As will be apparent, the arbor 12 and the cam 14 are fixed to the shaft 10 and rotate therewith. A coil is wound on arbor 12 with a wire 22 which is wrapped on a payout reel 24 and threaded through a hollow needle 26. The needle 26 is movable to accurately place each turn of the winding on the arbor 12.

The needle 26 is fixed to a rod member 28 which is slidably and rotatably mounted on bearings 30, 32. Bearing 30 is mounted in a block 34 which is fixed to a rod 36 while the bearing 32 is fixed in a bifurcated block 38. The bifurcated portion 40 of the block 38 receives a follower member 42 which is a part of a block 44 which is fixed to a shaft or rod 46. By means of this construction the needle 26 may be moved in to and out from the arbor 12 and may also be translated and oscillated from side to side across the width of the arbor 12.

The shaft or rod 36 is fixed to a block 48 which is pivotally mounted on a second block 50. The block 50 is mounted on a rod 52 which is slidable through a bearing 54 in a block 56. Rod 36 is slidable in bearings 58 which are mounted in fixed members 59 of the winding machine. Also, mounted on the rod 52 is a pivot member 60 which has a bearing 62 allowing pivot member 60 to be moved up and down the length of the rod 52. A pivot 64 extends from the pivot member 60 into a slot 66 formed in a fixed member 68, which forms a fixed portion of the winding machine. The rod 52 is free to slide in bearings 54 and 62 while the pivot member 64 may be locked in the desired position in slot 66 of fixed block 68 in any desired manner. In a similar manner the rod 46 is fixed in a block 70 which is pivotally mounted on the block 72. In a manner similar to that for rod 36, the rod 46 is slidable in bearings 58 mounted in fixed members 59, as shown. A shaft 74 is mounted on the block 72 and slidable in a bearing 76 in a block 78. A pivot member 80 is also slidable on the rod 74 by a bearing 82. A pivot 84 extends from the pivot member 80 into a second slot 67 in the fixed member 68. The rod 74 is free to slide in bearings 76 and 82 while the pivot 84 may be locked in the desired position in slot 67 of block 68 in any desired manner. Blocks 56 and 78 are secured but allowed to pivot about pins 57, 79, respectively, in block 86 which is fixed to a slide member 88. The slide member 88 has a cam follower 90 which fits in cam groove 92 of a cam member 94. The cam 94 is mounted on a shaft 95 which is rotated by a gear train (not shown) driven by shaft 10 of the winding machine. The cam groove 92 is formed in the surface of cam 94 and extends from one side to the other of the cam and back to the first side as it progresses around the surface of cam 94 as indicated.

Also, slide member 88 is provided with bearings 85. Shafts 87 extend through bearings 85 and are secured to fixed members 89 of the winding machine.

As will be apparent from the above description, as cam 94 rotates slide 88 is moved back and forth on shaft 87 by cam follower 90 riding in the cam groove 92. Movement of the slide 88 causes the blocks 56 and 78 to move lineally carrying therewith the rods 52 and 74. Rods 52 and 74 pivot about the pivots 64 and 84 and slide in bearings 54, 62 and 82, 76. The pivots 64 and 84 are so positioned on fixed member 68 that the rod 36 will move only a short distance while the rod 46 will move a greater distance. As the rod 36 moves, it translates needle 26 through the block 34 and the rod 28 across a portion of the width of arbor 12. At the same time, the rod 46 will cause needle 26 to rock or oscillate across the width of the arbor 12 through the block 44, follower 42, bifurcated member 38 and rod 28. Thus, the needle 26 is translated and oscillated across the width of the arbor 12, accurately positioning the wire 22 on the coil. Also, as will be clear, as the needle 26 is translated and oscillated across the width of the arbor 12, the angular relationship of the needle to the winding on the coil will be maintained so that the accurate positioning will follow through the particular angular positioning of the needle. From the above description it will be clear that the translation and oscillation of the needle 26 may be adjusted according to the width of arbor 12 and the cross wound open mesh coil being wound thereon, by placing the pivot members 60 and 80 at the appropriate position along the rods 52 and 74, respectively. This is accomplished by setting pivots 64, 84 in the appropriate position in slots 66, 67 respectively.

The needle 26 is moved into and out from the arbor 12 to follow the contours of the oval arbor 12 by means of cam 14 and follower 18. The cam groove 16 is oval in shape as before mentioned and rotates with shaft 10, in unison with arbor 12. A shaft 96 is rotatably mounted in the slide 20 which carries the cam follower 18. The shaft 96 is also mounted to move back and forth with the slide 20. Shaft 96 is rotatably and slidably mounted in the bearings 98 and 100 in fixed members 102 and 104 of the winding machine, as shown. A worm 106 is formed on shaft 96 and receives a worm gear 108. The worm gear 108 is fixed to shaft 110 which carries a gear 112 fixed thereto and meshing with a rack 114, generated on the needle shaft 28. A gear 116 is fixed to shaft 96 by a spline for rotation of shaft 96. The gear 116 is driven by gear 118 which is connected by a gear train which is connected to shaft 10 by a timing belt (not shown).

The above construction allows the needle 26 to move in and out following the contour of oval arbor 12 and also, backs the needle 26 away from the arbor 12 as each turn of the coil is wound on the arbor 12. As will be apparent, as cam 14 rotates, the cam groove 16 moves slide 20 back and forth following the oval contour, through the cam follower 18. The slide 20 moves shaft 96 which in turn moves the needle shaft 28 and thus needle 26 along the oval contour by means of the worm 106, the worm gear 108, the shaft 110, gear 112 and the rack 114. Also, as each return is laid on the arbor 12, the gear 118 rotates gear 116 to thereby rotate shaft 96. The worm 106 on shaft 96 rotates gear 108 and through shaft 110, the gear 112. Gear 112, which meshes in the rack 114 will move the shaft 28 back away from the arbor 12, a portion of the total buildup of wire on arbor 12 for each turn which is laid on the arbor 12. Thus, as the turns are laid on the arbor 12 forming the coil wound thereon, the needle 26 is backed away for each turn to thereby maintain the needle tangential to the surface of the coil being wound thereon.

FIGURES 2 and 3 show the relation of needle 26 to arbor 12 as the oval or elliptical arbor 12 rotates on drive shaft 10. As shown in FIGURE 2, when arbor 12 has its minor axis horizontal, needle 26 is much closer to shaft 10 than in FIGURE 3, where the minor axis of arbor 12 is vertical. The cam 14 and cam groove 16 enable needle 26 to move in and out to follow the oval contour of arbor 12.

While the above sets forth the present preferred embodiment of the invention, it will be obvious to those skilled in the art that various changes may be made in different items of construction without departing from the spirit and scope of the invention, particularly as it is set forth in the appended claims.

What is claimed as new and which it is desired to secure by Letters Patent of the United States is:

1. A winding machine for winding oval shaped, cross wound, open mesh coils comprising in combination:
   (a) a drive shaft,
      (1) an oval shaped arbor mounted on said drive shaft,
      (2) an oval shaped cam member mounted on said drive shaft,
   (b) a winding device including a hollow needle movably mounted on a rod member and positioned with respect to said winding arbor for laying wire on said arbor,
   (c) follower means contacting said cam on said drive shaft,
   (d) a slide mounted on said follower means,
      (1) said slide being connected to said needle rod for moving said needle rod in conjunction with the contour of said oval arbor,
   (e) a worm gear connected to said needle rod,
      (1) means rotating said worm gear in conjunction with said drive shaft,
      (2) said worm gear moving said needle rod away from said arbor as each turn is laid on said arbor.

2. A winding machine as claimed in claim 1 in which a shaft member is rotatably fixed in said slide, a worm on said shaft, said worm gear meshing with said worm, and said means rotating said worm gear in conjunction with said drive shaft being gear means connected to said shaft.

3. A winding machine for winding oval shaped, cross wound, open mesh coils comprising in combination:
   (a) a drive shaft,
      (1) an oval shaped arbor mounted on said drive shaft,
      (2) an oval shaped cam member mounted on said drive shaft, (b) a winding device including a hollow needle movably mounted on a rod member and positioned with respect to said winding arbor for laying wire on said arbor, (c) shaft means connected to said needle rod for translating and oscillating said needle rod, (d) a first slide device (e) a cam member,
   (1) said cam member operating said first slide device,
   (2) said shaft means being pivotally connected to said first slide device whereby translation and oscillation of said needle rod is obtained, (f) follower means contacting said cam member on said drive shaft, (g) a second slide mounted on said follower means,
   (1) said second slide being connected to said needle rod for moving said needle rod in conjunction with the contour of said oval arbor.

4. A winding machine as claimed in claim 3 in which said shaft means includes a pair of shafts, one of said shafts being secured to said needle rod for translating said needle rod on movement of said slide device, the other of said shafts having a pivotal connection with said needle rod for oscillating said needle rod on movement of said slide device.

5. A winding machine for winding oval shaped, cross wound, open mesh coils comprising in combination:

(a) a drive shaft,
   (1) an oval shaped arbor mounted on said drive shaft,
   (2) an oval shaped cam member mounted on said drive shaft, (b) a winding device including a hollow needle movably mounted on a rod member and positioned with respect to said winding arbor for laying wire on said arbor, (c) shaft means connected to said needle rod for translating and oscillating said needle rod, (d) a cam member,
   (1) means connecting said cam member for rotation with said drive shaft,
   (2) said cam member operating a first slide device,
   (3) said shaft means being pivotally connected to said first slide device whereby translation and oscillation of said needle rod is obtained, (e) follower means contacting said cam on said drive shaft, (f) a second slide mounted on said follower means,
   (1) said second slide being connected to said needle rod for moving said needle rod in conjunction with the contour of said oval arbor, (g) a worm gear connected to said needle rod,
   (1) said worm gear rotating to move said needle rod away from said arbor as each turn is laid on said arbor.

6. A winding machine as claimed in claim 5 in which said shaft means includes a pair of shafts, one of said shafts being secured to said needle rod to translate said needle rod on movement of said first slide, the other of said shafts having a pivotal connection to said needle rod to oscillate said needle rod on movement of said first slide.

7. A winding machine as claimed in claim 5 in which a shaft is rotatably fixed in said second slide, a worm formed on said shaft, said worm gear meshing with said worm, a rack on said needle rod, a gear meshing with said rack, said gear and said worm gear interconnected for rotation and sliding movement.

References Cited

UNITED STATES PATENTS

| 1,501,670 | 7/1924 | Koch | 242—7.13 |
| 1,504,005 | 8/1924 | Vienneau | 242—7.15 |

NATHAN L. MINTZ, Primary Examiner

Dedication 3,462,091.—*Richard N. Adrien*, Somersworth, N.H., and *Lee H. Duggan*, Arlington, Mass. CROSS WOUND COIL WINDING MACHINE. Patent dated Aug. 19, 1969. Dedication filed Mar. 4, 1971, by the assignee, *General Electric Company*.

Hereby dedicates the entire term of said patent to the Public.

[*Official Gazette June 15, 1971.*]